United States Patent [19]

Li et al.

[11] Patent Number: 4,638,042

[45] Date of Patent: Jan. 20, 1987

[54] COPOLYMERS CONTAINING INDENE

[75] Inventors: George S. Li, Solon; Muyen M. Wu, Hudson; Elmer J. De Witt, Cuyahoga Falls, all of Ohio

[73] Assignee: The Standard Oil Company, Cleveland, Ohio

[21] Appl. No.: 859,521

[22] Filed: May 5, 1986

[51] Int. Cl.[4] ............................................. C08F 32/06
[52] U.S. Cl. .................................................... 526/280
[58] Field of Search ......................................... 526/280

[56] References Cited

U.S. PATENT DOCUMENTS 3,997,709  12/1976  Aziz ..................................... 526/280
4,007,162  2/1977  Eskamani ............................ 526/280
4,074,038  2/1978  Li ......................................... 526/280

*Primary Examiner*—Paul R. Michl
*Attorney, Agent, or Firm*—Charles S. Lynch; John E. Miller; Larry W. Evans

[57] ABSTRACT

Normally solid copolymers that are the result of addition polymerization of methyl methacrylate and indene, containing the monomers combined in the polymer structure in the following weight percentages:

| | Weight Percent |
|---|---|
| Methyl methacrylate | 46–95 |
| Indene | 54–5. |

2 Claims, No Drawings

COPOLYMERS CONTAINING INDENE

This invention relates to novel copolymers of methyl methacrylate and indene.

It is an object of the present invention to provide new copolymers which polymers have a wide range of utilities, particularly in raising the heat distortion temperatures of poly(vinyl chloride) compounds when blended therewith.

Other objects, as well as aspects, features and advantages, of the present invention will becomes apparent from a study of the specification, including the examples and the claims.

According to the present invention there are provided normally solid copolymers that are the result of addition polymerization of methyl methacrylate with indene, said copolymers containing the monomers combined in the polymer structure in the following weight percentages:

|                   | Weight Percent |
|-------------------|----------------|
| Methyl methacrylate | 46–95        |
| Indene            | 54–5           |

It is also optional that the present copolymers contain, per 100 weight parts of the combined indene and methyl methacrylate, from 0.01 up to 3 weight parts combined in the polymer structure, of a cross-linking agent such as polyunsaturated hydrocarbons, esters, amides, nitriles, acids, sulfones, polyunsaturated acid anhydrides, polyunsaturated ethers such as divinyl ether, diallyl ether, diallyl ethylene glycol ether, the vinyl, allyl, methallyl and crotyl polyethers containing 2 to 7 or more alkenyl ether groups per molecule, polyunsaturated ketones such as divinyl ketone, diallyl ketone, allyl-beta-allyloxy propionate, allyl methacrylyl sucrose, monoallyl maleate, and partial allyl ethers of polyhydric alcohols such as diallyl glycerol ether. Generically, these cross-linking agents are any polymerizable material polymerizable with indene or methyl methacrylate and having a plurality of $CH_2{=}C{<}$ groupings.

The new copolymers of the invention, including those in the examples herein, all have inherent viscosities of at least 0.08 deciliters per gram of polymer.

Inherent viscosities in this application (including the claims) are always expressed in deciliters per gram, measured at 25° C., using 0.2 grams of the polymer in 100 cc of dimethylformamide for the copolymers, and in the case of the PVC, using 0.2 grams of the PVC in 100 cc of cyclohexanone.

The copolymers of the invention are all useful in a number of applications: as extenders for butadiene-acrylonitrile copolymer rubbers of commerce; as hot melt adhesives for general purposes but especially for adhering acrylonitrile copolymer plastic parts together; as processing aids for poly(vinyl chloride) resins when used in amount of, for instance, 1–5 weight percent of the PVC; and as a potting compound or an encapsulating medium for various electric or electronic components and the like. The copolymers are all especially useful when compounded with PVC, in amounts of 20–35 weight percent. Such compositions or blends have increased heat distortion temperatures compared to the same unblended PVC, while retaining the generally good PVC physical properties.

The new polymers of the invention are all useful in particulate form as pigments in paint. They can be used, for instance, in the following paint formula:

| Ingredient | Lbs. |
|---|---|
| Copolymer | 100 |
| Titanium dioxide | 110 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |

Properties reported in this application were determined by the procedures of the following ASTM designations:

| Heat Distortion Temperature | ASTM D 648(264 psi, unannealed) |
|---|---|
| Tensile Strength | ASTM D (Modified) |
| Flexural Strength | ASTM D 790 |
| Flexural Modulus | ASTM D 790 |
| Melt Index | ASTM D 1238 |

The following examples illustrate the compositions of the invention, how to make them, and their usefulness in PVC blends, but they are not to be considered as limiting.

In the examples unless otherwise stated, the PVC used in the blends was an injection grade PVC having an inherent viscosity of 0.68 deciliters/gm. for a 0.5 weight percent solution in cyclohexanone, and when stabilized with 3 parts by weight of Thermolite 813 per 100 parts of PVC, the PVC had a tensile strength of 8,500 psi, and HDT of 70° C., a flexural strength of 12,400 psi, a flexural modulus of 430,000 psi, a notched Izod of 0.26 ft-lbs/sq. in., and a melt index of 0.6 grams/10 minutes.

In the examples, Thermolite 813 is di-n-octyltin maleate polymer sold by M & T Chemicals Inc. having the formula

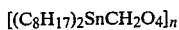

$[(C_8H_{17})_2SnCH_2O_4]_n$ having a melting point of 90° C. and specific gravity of 0.6. It is a commonly used thermal stabilizer.

EXAMPLE 1

A copolymer was made by emulsion polymerization according to the following recipe. Amounts are in weight parts per 100 parts of total monomers.

| PHM | Components |
|---|---|
| 200 | $H_2O$ |
| 3.0 | Sodium lauryl sulfate |
| 1.0 | $Na_2S_2O_8$ |
| 1.0 | $Na_3PO_4.12H_2O$ |
| 80 | Methyl Methacrylate |
| 20 | Indene |

The sodium lauryl sulfate and the sodium phosphate were dissolved in water and charged to the reactor fitted with a cooling condenser. The reactor contents were place under a nitrogen atmosphere. The reactor was charged with the monomers, and the contents of the reactor were heated to 60° C. and agitated with a mechanical stirrer. Polymerization was initiated by the sodium persulfate and was continued for 16 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 47 percent yield. Its composition, as determined by nitrogen analysis, was 86 methyl methacrylate and 14 indene in weight percent.

25 parts by weight of the copolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 77.5° C., the tensile strength was 10,190 psi, the flexural strength was 13,680 psi and the flexural modulus 388,000 psi. The melt index of the blend was 0.715 g./10 min at 175° C.

EXAMPLE 2

A copolymer was made by emulsion polymerization according to the following recipe. Amounts are in weight parts per 100 parts of total monomers.

| PHM | Components |
| --- | --- |
| 200 | $H_2O$ |
| 3.0 | Sodium lauryl sulfate |
| 1.0 | $Na_2S_2O_8$ |
| 1.0 | $Na_3PO_4.12H_2O$ |
| 46 | Methyl Methacrylate |
| 54 | Indene |

The sodium lauryl sulfate and the sodium phosphate were dissolved in water and charged to the reactor fitted with a cooling condenser. The reactor contents were placed under a nitrogen atmosphere. The reactor was charged with the monomers, and the contents of the reactor were heated to 60° C. and agitated with a mechanical stirrer. Polymerization was initiated by the sodium persulfate and was continued for 16 hours at 60° C.

After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. The copolymer was obtained in a 88 percent yield. Its composition, as determined by gas chromatograph analysis of residual monomers and the yield, was 73 methyl methacrylate and 27 indene in weight percent.

25 parts by weight of the copolymer was mixed with 75 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT and other physical properties, as noted below:

The HDT of the blend was 75° C., the tensile strength was 10,230 psi, the flexural strength was 11,310 psi and the flexural modulus 401,000 psi. The melt index of the blend was 1.164 g./10 min at 175° C.

EXAMPLE 3

A copolymer was made by bulk polymerization, as follows. 90 parts by weight methyl methacrylate, 10 parts by weight indene and 0.4 parts by weight 2,2'-azobis(2,4-dimethylvaleronitrile) were charged into an ampule, purged with $N_2$, and the ampule was sealed and placed in a water bath at 60° C. and gently agitated for 68 hours. Then the polymer ampule was cooled, broken open, and the contents into MeOH. The yield ws 90 percent. The polymer composition was in weight percent 92 methyl methacrylate and 8 percent indene as determined by $C^{13}$ NMR.

When a blend is made with PVC as in Example 1, similar results are obtained, including a higher HDT and a higher melt index than without the 25 parts of copolymer.

EXAMPLE 4

A copolymer was made by emulsion polymerization using the following recipe. Amounts are in weight parts per 100 parts of total monomers.

| Water | 200 |
| --- | --- |
| Sodium Lauryl Sulfate | 2.5 |
| Sodium Phosphate 12 $H_2O$ | 1.0 |
| Methyl Methacrylate | 40 |
| Indene | 60 |
| Sodium Persulfate | 1.0 |

The reactor was charged with the ingredients listed above, purged with nitrogen and sealed. The reactor was then mechanically agitated and heated to 60° C. for 24 hours. The polymer was recovered by freeze coagulation followed by washing with methanol and dried. The yield of polymer was 49 percent. The composition of the polymer was 77.5% methyl methacrylate and 22.5% indene, determined by $C^{13}$ NMR.

When a blend is made with PVC as in Example 2, similar results are obtained, including a higher HDT and a higher melt index than without the 25 parts of copolymer.

EXAMPLE 5

A copolymr was made by emulsion polymerization using the following recipe. Amounts are in weight parts per 100 parts of total monomers.

| Water | 200 |
| --- | --- |
| Sodium Lauryl Sulfate | 2.5 |
| Sodium Phosphate 12 $H_2O$ | 1.0 |
| Methyl Methacrylate | 20 |
| Indene | 80 |
| Sodium Persulfate | 1.0 |

The reactor was charged with the ingredients listed above, purged with nitrogen and sealed. The reactor was then mechanically agitated and heated to 60° C. for 24 hours. The polymer was recovered by freeze coagulation followed by washing with methanol and dried. The yield of polymer was 24 percent. The composition of the polymer was 70% methyl methacrylate and 30% indene, determined by $C^{13}$ NMR.

When a blend is made with PVC as in Example 2, similar results are obtained, including a higher HDT and a higher melt index than without the 25 parts of copolymer.

As will be evident to those skilled in the art, various modifications of this invention can be made or followed in the light of the foregoing disclosure and discussion without departing from the spirit and scope of the disclosure or from the scope of the claims.

We claim:

1. Normally solid copolymers that are the result of addition polymerization of methyl methacrylate and indene, containing the monomers combined in the polymer structure in the following weight percentages:

|  | Weight Percent |
|---|---|
| Methyl methacrylate | 46–95 |
| Indene | 54–5. |

2. A composition of claim 1 wherein the addition polymer contains combined in its structure 0.01 to 3 parts by weight, per 100 parts by weight of indene and methyl methacrylate in the addition polymer structure, of a cross-linking agent having a plurality of $CH_2=C<$ groupings.

* * * * *